(12) United States Patent
Kapoor et al.

(10) Patent No.: US 8,473,628 B2
(45) Date of Patent: Jun. 25, 2013

(54) DYNAMICALLY ALTERING PLAYLISTS

(75) Inventors: Abhinav Kapoor, Fremont, CA (US); Kevin Streeter, San Francisco, CA (US); Asa Whillock, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 760 days.

(21) Appl. No.: 12/201,952

(22) Filed: Aug. 29, 2008

(65) Prior Publication Data

US 2010/0057928 A1 Mar. 4, 2010

(51) Int. Cl.
G06F 15/16 (2006.01)

(52) U.S. Cl.
USPC .............. 709/231; 709/203; 725/44; 725/45; 725/46; 725/47; 725/48

(58) Field of Classification Search
USPC ................................ 709/203, 231; 725/44–48
See application file for complete search history.

(56) References Cited

U.S. PATENT DOCUMENTS

| | | | |
|---|---|---|---|
| 6,938,047 B2 | 8/2005 | Kryeziu | |
| 7,400,764 B2 | 7/2008 | Kryeziu | |
| 7,496,676 B2 | 2/2009 | Kryeziu | |
| 7,565,605 B2 * | 7/2009 | Schohn et al. | 715/249 |
| 7,627,646 B2 * | 12/2009 | Gautier | 709/217 |
| 7,818,444 B2 | 10/2010 | Brueck et al. | |
| 7,827,259 B2 * | 11/2010 | Heller et al. | 709/223 |
| 7,873,760 B2 | 1/2011 | Versteeg | |
| 2002/0133247 A1 | 9/2002 | Smith et al. | |
| 2005/0071881 A1 * | 3/2005 | Deshpande | 725/88 |
| 2005/0234983 A1 * | 10/2005 | Plastina et al. | 707/104.1 |
| 2006/0156239 A1 * | 7/2006 | Jobs et al. | 715/727 |
| 2007/0079327 A1 * | 4/2007 | Khoo et al. | 725/35 |
| 2007/0156679 A1 * | 7/2007 | Kretz et al. | 707/6 |
| 2007/0174866 A1 * | 7/2007 | Brown et al. | 725/28 |
| 2007/0192812 A1 | 8/2007 | Pickens et al. | |
| 2007/0220552 A1 * | 9/2007 | Juster et al. | 725/46 |
| 2007/0226365 A1 * | 9/2007 | Hildreth et al. | 709/231 |
| 2007/0244880 A1 * | 10/2007 | Martin et al. | 707/5 |
| 2007/0282905 A1 * | 12/2007 | Karlberg | 707/104.1 |
| 2008/0250319 A1 * | 10/2008 | Lee et al. | 715/716 |
| 2008/0310825 A1 * | 12/2008 | Fang et al. | 386/124 |
| 2009/0063975 A1 * | 3/2009 | Bull et al. | 715/716 |
| 2009/0094248 A1 * | 4/2009 | Petersen | 707/10 |
| 2009/0099919 A1 * | 4/2009 | Schultheiss et al. | 705/14 |

(Continued)

OTHER PUBLICATIONS

Bill Birney, "Intelligent Streaming," Microsoft Corporation, May 2003, retrieved from internet: http://www.microsoft.com/windows/windowsmedia/howto/articles/intstreaming.aspx?pf=true, 7 pages.

(Continued)

Primary Examiner — Duyen Doan
(74) Attorney, Agent, or Firm — Finch & Maloney PLLC

(57) ABSTRACT

In general, in one aspect, streams associated with a playlist are received from a server. The playlist includes an ordering of streams that are queued for client-side playback from the server according to the ordering. Information associated with the receipt and playback of at least one of the streams is accessed. The client-side application requests to alter the streams of the playlist in response to the accessed information. The request identifies a desired playlist alteration and includes information that controls the playlist alteration. The streams of the playlist are displayed according to a playlist alteration made in response to the request.

28 Claims, 7 Drawing Sheets

U.S. PATENT DOCUMENTS

| | | | |
|---|---|---|---|
| 2009/0177996 A1* | 7/2009 | Hunt et al. | 715/788 |
| 2009/0307367 A1 | 12/2009 | Gigliotti | |
| 2010/0162330 A1* | 6/2010 | Herlein et al. | 725/93 |
| 2011/0066673 A1 | 3/2011 | Outlaw | |

OTHER PUBLICATIONS

"Move Networks Solutions," Move Networks, Inc., retrieved from internet on Aug. 29, 2008: http://www.movenetworks.com/why-move/solutions, 4 pages.

"Move Media Player," Move Networks, Inc., retrieved from internet on Aug. 29, 2008: http://www.movenetworks.com/wp-content/uploads/move-media-playr.pdf, 3 pages.

"Move Adaptive Stream," Move Networks, Inc., retrieved from internet on Aug. 29, 2008: http://www.movenetworks.com/wp-content/uploads/move-adaptive-stream.pdf, 4 pages.

"Our Clients," Move Networks, Inc., retrieved from internet on Aug. 29, 2008: http://www.movenetworks.com/why-moye/our-clients, 3 pages.

SWF File Format Specification, Version 10, Adobe Systems Incorporated, Nov. 2008 (http://www.adobe.com/devnet/swf/pdf/swf_file_format_spec_v10.pdf).

"Our Clients," Move Networks, Inc., retrieved from the internet on Aug. 29, 2008.

Office Action in U.S. Appl. No. 12/559,029 mailed Mar. 1, 2011, 11 pages.

Office Action in U.S. Appl. No. 12/559,029 mailed Aug. 19, 2011, 8 pages.

"Move Media Player, Move Networks", http://web.archive.org/web/20080516004150/http://www.movenetworks.com/wpcontent/uploads/move-media-player.pdf, May 16, 2008.

"Move Adaptive Stream, Move Network,", web page athttp://web.archive.org/web/20081010161808/http://www.movenetworks.com/wpcontent/uploads/move-adaptive-stream.pdf, Oct. 10, 2008.

"Move Networks, Move Networks Solutions", web page at http://web.archive.org/web/20080913152314/http://www.movenetworks.com/why-move/solutions, as available via the Internet and printed Apr. 19, 2012.

"Our Clients, Move Networks,", web page at http://web.archive.org/web/20080831021014/http://www.movenetworks.com/why-move/our-clients, as available via the Internet and printed Apr. 19, 2012.

Birney, Bill, "Intelligent Streaming", web page at http://www.microsoft.com/windows/windowsmedia/howto/articles/intstreaming.aspx, as available via the Internet and printed Apr. 19, 2012.

* cited by examiner

DYNAMICALLY ALTERING PLAYLISTS

BACKGROUND

The present disclosure relates generally to delivering and presenting multimedia content.

Streaming is a technique for delivering multimedia content to end-users. Streaming involves continuously displaying media content to a user while the content is being delivered to the user. Streaming can be used to deliver various types of digital media to end-users. Streaming media can include, for example, recorded (e.g., recorded video) and/or live media content (e.g., video from a user's webcam).

Publishers can create content for streaming by encoding content (e.g., audio and video) with one or more codecs. A streaming media server can then receive and transmit created streams over a network (e.g., the Internet) to a client device. The client device can include a client-side player that decompresses and displays streams for an end-user.

Streaming media environments can use virtual machines to present streaming content to end-users. A virtual machine is a self-contained operating environment that allows programs to be run within the virtual machine platform itself as though the virtual machine were a stand-alone computer. Virtual machines can be programs themselves, embedded within an operating system or other software application. One example of a virtual machine is the Adobe® Flash® Player runtime (available from Adobe Systems Incorporated of San Jose, Calif.), which can be used to run Flash® files including ActionScript and Shockwave Flash (SWF) files.

Customized image viewers and video players can run on virtual machines and present streaming media to end-users. These customized applications can be used to facilitate web applications in providing interactive rich media content. Applications configured to execute on the Adobe® Flash® platform can be included in SWF files, which can be processed by client-side SWF player software. The media content itself can be kept separate from the SWF file and can be loaded into a SWF for playback at runtime.

Playlists can be used during streaming. A playlist can include a list of streams queued up for playback. The streams in the playlist can be streamed to the user and played from a source (e.g., the streaming media server) one after the other in the order they are queued. Streams from a playlist can be presented to end-users through customized image viewers, video players and audio players, which can be associated with various other applications.

SUMMARY

This specification describes technologies relating to dynamically altering a playlist that includes streaming content. The playlist can be altered in response to client-side feedback, which can include runtime performance information and/or user preferences.

In general, in one aspect, a computer-implemented method is provided. The method includes: receiving, from a server, streams associated with a playlist, the playlist including an ordering of streams that are queued for client-side playback from the server according to the ordering; accessing client-side playback conditions associated with the receipt and playback of at least one of the streams; requesting, by a client-side application, to alter the streams of the playlist in response to the client-side playback conditions, the request identifying a desired playlist alteration and including information that controls the playlist alteration; and displaying the streams of the playlist according to a playlist alteration made in response to the request. Other embodiments can include corresponding systems, apparatus and computer program products.

Implementations can include one or more of the following features. For example, in some implementations, the streams of the playlist include at least one of: audio streams, video streams, mixed streams having audio and video, text-based data, still image data and user-defined data. The streams can include live streams. In some implementations, the playlist is created by the client-side application.

Accessing client-side playback conditions can involve accessing at least one of network bandwidth availability, client processing capability and user viewing statistics. The desired playlist alteration can include at least one of (i) a reordering of the streams in the playlist; (ii) a removal of a stream from the playlist; and (iii) an insertion of a new stream into the playlist at a specified insertion point in the playlist. The desired playlist alteration can include a replacement of a stream in the playlist with a different version of the stream, the different version requiring different network and processing resources than the stream being replaced. The desired playlist alteration can include a replacement of a stream in the playlist with a different stream having different content than content of the stream being replaced. The desired playlist alteration can include a replacement of a currently-playing stream with a new stream, where the request identifies the currently-playing stream and the new stream and includes control information that specifies whether or not to replace the currently-playing stream at an intermediate position.

In general, in another aspect, a computer-implemented method is provided. The method includes: streaming media streams associated with a playlist to a client, the playlist including an ordering of streams that are queued for client-side playback according to the ordering; receiving, from the client-side application, a request for an alteration of the playlist responsive to detected client-side conditions, the request identifying a desired playlist alteration and including information that controls the playlist alteration; altering the playlist based on the received request; and streaming the media streams associated with the playlist according to the alteration. Other embodiments can include corresponding systems, apparatus and computer program products.

Implementations can include one or more of the following features. For example, in some implementations, the streams associated with the playlist include at least one of recorded or live: audio streams, video streams, mixed streams having audio and video, text-based data, still image data and user-defined data.

Altering the playlist can include at least one of (i) reordering the streams in the playlist; (ii) removing a stream from the playlist; and (iii) inserting a new stream into the playlist at a specified insertion point in the playlist. Altering the playlist can include replacing a stream in the playlist with a different version of the stream, where the different version requires different network and processing resources than the stream being replaced. Altering the playlist can include replacing a stream in the playlist with a different stream having different content than content of the stream being replaced. Altering the playlist can include replacing a currently-streaming stream with a new stream, where the currently-streaming stream is replaced at an earliest key frame in the new stream such that playback of the currently-streaming stream appears uninterrupted.

In general, in another aspect, a system is provided. The system comprises one or more processors to perform operations comprising: streaming media streams associated with a playlist to a client, the playlist including an ordering of streams that are queued for client-side playback according to the ordering; receiving, from the client-side application, a request for an alteration of the playlist responsive to detected client-side conditions, the request identifying a desired playlist alteration and including information that controls the playlist alteration; altering the playlist based on the received request; and streaming the media streams associated with the playlist according to the alteration.

Implementations can include one or more of the following features. For example, in some implementations, the streams associated with the playlist include at least one of recorded or live: audio streams, video streams, mixed streams having audio and video, text-based data, still image data and user-defined data.

In some implementations, altering the playlist includes at least one of (i) reordering the streams in the playlist; (ii) removing a stream from the playlist; and (iii) inserting a new stream into the playlist at a specified insertion point in the playlist. Altering the playlist can include replacing a stream in the playlist with a different version of the stream, where the different version requires different network and processing resources than the stream being replaced. Altering the playlist can include replacing a stream in the playlist with a different stream having different content than content of the stream being replaced. Altering the playlist can include replacing a currently-streaming stream with a new stream, where the currently-streaming stream is replaced at an earliest key frame in the new stream such that playback of the currently-streaming stream appears uninterrupted.

In some implementations, the system further comprises one or more processors to perform operations comprising: receiving the streamed media streams associated with the playlist; detecting client-side playback conditions associated with the receipt and playback of at least one of the received streams; sending the request for an alteration of the playlist; and displaying the streams of the playlist according to the alteration.

Aspects of the subject matter described in this specification can be implemented to realize one or more of the following and/or other advantages. Implementations consistent with this disclosure can be used to dynamically replace one stream in a playlist with another without affecting other streams in the playlist. Switches can automatically occur at a suitable point so that playback appears seamless and without glitches or pauses. Also, in some examples, streams of a playlist can be reordered without resetting and recreating the playlist. Additionally, implementations consistent with this disclosure can provide for application control over playlist alterations. For example, if a server already started streaming content from a playlist, the application can decide whether or not the server should switch the currently-streaming content stream to another stream.

During playback of streams in a playlist, bandwidth availability and/or system resources can change (e.g., due to other applications running on the system). In these scenarios, it may be desirable to replace one or more streams in the playlist with streams that have the same content but that are encoded at a different quality. Implementations consistent with this disclosure can dynamically update streaming content with different resolution or bit rate versions to suit available bandwidth and system resources. The playlist can be updated to include these different versions without recreating the playlist and without interrupting the playback experience when the update occurs.

As an example, a user queues up streams in a playlist with 500 kbps video for a medium to high bandwidth environment. A server then starts streaming the playlist but, during playback, the network only provides 300 kbps bandwidth. To avoid stuttering video resulting from this decreased bandwidth, the currently-playing video should be switched to a lower bit rate version, such as a version with a bit rate of less than 300 kbps. Additionally, all the other high bit rate (in this case, greater than 300 kbps) video streams queued up in the playlist should be switched to their lower bit rate versions as well. Implementations consistent with this disclosure can update the relevant streams affected by the bandwidth reduction with their lower bit rate versions without causing any pauses in the playback. Additionally, if a target stream that needs to be switched is already playing it can be switched or not with API (application programming interface) control by the application.

In another scenario, an application may wish to switch a stream in a playlist based on viewing history of a user. For example, based on previous viewer behavior, the application may wish to replace a particular stream in the playlist with a completely different stream having different content (and not just a different quality or bit rate version of the same content as in the previous scenario) at a point in the playlist that is between other video streams which should remain unchanged. As an example, the application may wish to replace one streaming commercial in a playlist with another commercial, where the commercial occurs between live video streams that should remain unchanged. In such a scenario, it may be undesirable to switch the streams at an any intermediate location (e.g., in the middle of the streams), since this would cause a sudden abrupt change of content in the playback when the streams are switched. Implementations consistent with this disclosure can allow the application to control and specify the type of switch to avoid such abrupt changes.

The details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
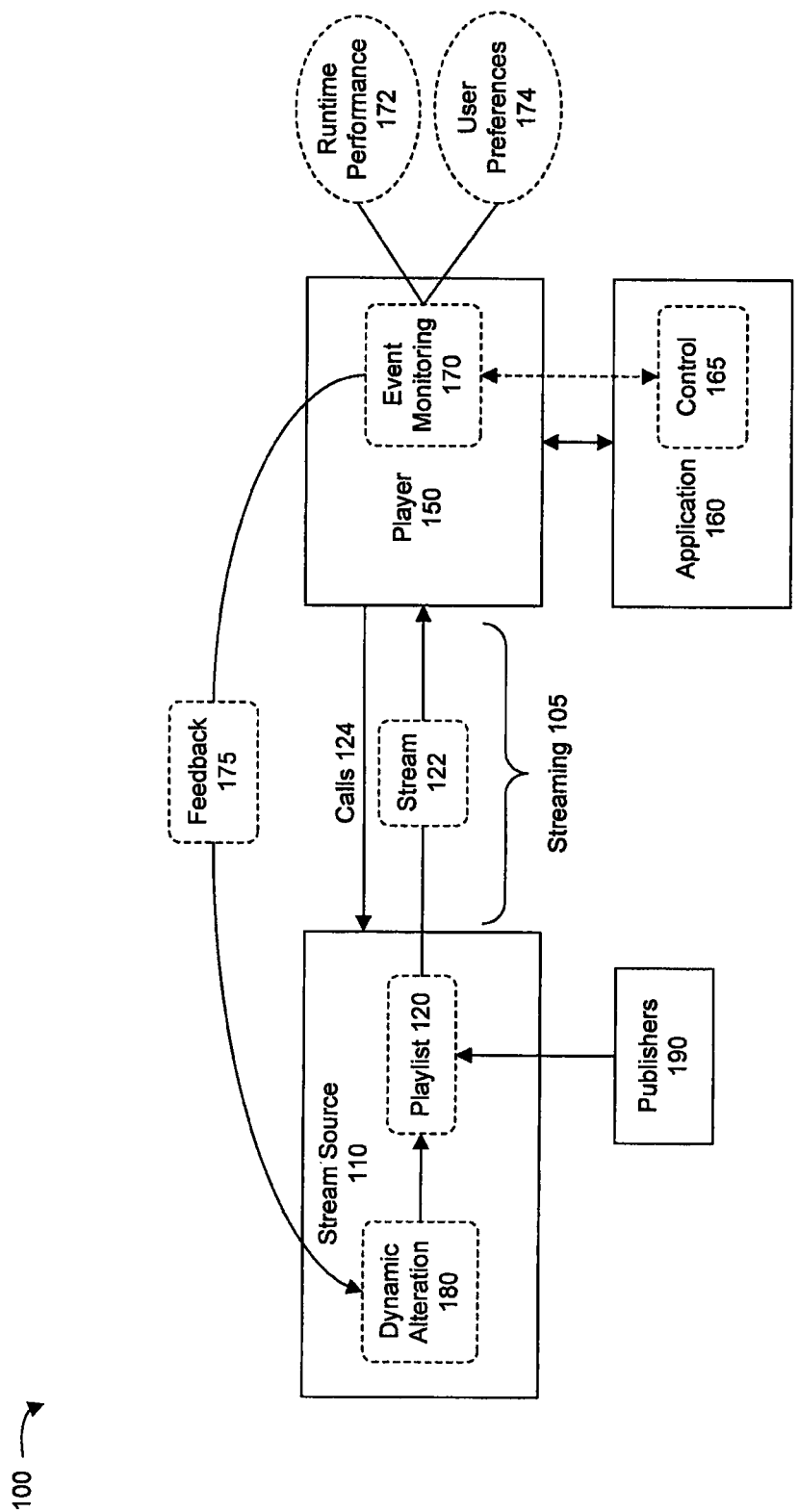
FIG. 1 is a diagram showing an example dataflow.

FIG. 1 shows an example dataflow 100 in which a playlist 120 including one or more streams 122 can be dynamically altered. The dataflow 100 is an example and not intended to be restrictive. Various modifications to the dataflow 100 are therefore possible without departing from the scope of this disclosure.

As used herein, a "playlist" can refer to an ordering of one or more content streams that are queued to be streamed and played in the order they are queued. In some examples, playlists can be implemented in XML (eXtensible Markup Language) and can include various information identifying the content streams in the playlist. As used herein, a "content stream" or "stream" can refer to any media or other data item that can be presented to a user. Streams can include, for example, video content, audio content and/or a combination of audio and video content. In some implementations, the streams associated with a playlist can include various other data content as well, such as text-based data, still image data and/or user-defined data.

The streams can be created and stored in various formats, which can employ various compression schemes (e.g., lossy and/or lossless compression) and various data structures (e.g., raster graphics and/or vector graphics). The streams can be created and stored in formats that allow for synchronized audio and video. In some examples, the streams can be represented in the MPEG-4 (Moving Picture Experts Group) format, the SWF format, the FLV (Flash Video File) format and/or the F4V format. Various other formats are also possible, including Waveform Audio (WAV), Audio Interchange File Format (AIFF); Free Lossless Audio Codec (FLAC), Apple Lossless, Windows Media Audio (WMA), MP3, Advanced Audio Coding (AAC), GIF (Graphic Interchange Format), PNG (Portable Network Graphics), and HTTP (Hypertext Transfer Protocol). Other formats are also possible.

During a streaming 105 phase of the dataflow 100, the streams 122 associated with the playlist 120 can be streamed from a source 110 to a player 150. As used herein, "streaming" (or any other form of the term "stream" when used as a verb) refers to delivering bits of a stream such that the stream is continuously displayed to a user while the stream is being delivered to the user. When content is streamed to a destination, the content is displayed at the destination as the bits are delivered and then discarded without being permanently stored locally at the destination.

The stream source 110 can include, for example, a media server or hub configured for streaming content over a network, such as the Internet. In some implementations, the stream source 110 can include the Adobe® Flash® Media Server (FMS) system, available from Adobe Systems Incorporated of San Jose, Calif. The stream source 110 can maintain the playlist 120. In some examples, each stream 122 in the playlist 120 can be associated with a corresponding file stored in or accessible to the stream source 110. For example, each stream 122 can be associated with a FLV or other type of file maintained or accessible to the stream source 110. The playlist 120 can include pointers to the files corresponding to the content streams 122.

The player 150 can include any mechanism that processes and displays streams for an end-user. The player 150 can include, for example, a client-side virtual machine configured as a standalone player or as a plugin for browsers (such as Mozilla Firefox, Opera, Safari and Internet Explorer). In some examples, the player 150 can include the Adobe® Flash® Player runtime (available from Adobe Systems Incorporated of San Jose, Calif.), which can run for example SWF files, FLV files and/or F4V files.

During the streaming 105, a persistent connection can be established between the stream source 110 and the player 150. This connection can facilitate the streaming 105 from the source 110 to the player 150. In some implementations, the connection may be established using TCP (Transmission Control Protocol), UDP (User Datagram Protocol) and/or other protocols. For example, the player 150 may connect to the stream source 110 using RTMP (Real Time Messaging Protocol) and/or RTMFP (Real Time Media Flow Protocol).

The playlist 120 can be created in a variety of ways. In some examples, the playlist 120 can be generated by the stream source 110. In some examples, a client-side application 160 running on the player 150 can be involved in the creation of the playlist 120. The application 160, for example, can make one or more calls 124 to the stream source 110 to add individual content streams (e.g., the stream 122) into the playlist 120. These streams can be appended one after the other to be played in a queue in the same order. In some examples, as detailed below, streams can be inserted into and deleted from the playlist at specified insertion and deletion points. The stream source 110 maintains the playlist 120 and delivers the bits of these streams to the player 150 during the streaming 105 phase.

As used herein, the term "application" refers to any computer program having some defined purpose appreciable by a user. An application can include various computer programs (also referred to as programs, software, software applications, software modules, or code), which contain instructions executable and/or interpretable by a processor. An application can include one or more files containing various information, such as source code, machine code, libraries, data, documentation, configuration information, icons, or any other resources that can be used by an application and the installation procedure for that application. An application (or portion thereof) can be platform dependent or independent. The application 160 can, in some implementations, represent an application created using various application development frameworks and/or web development tools, such as Adobe® Flex® BUILDER™ software, Adobe® Flash® software and Adobe® Dreamweaver® software, available from Adobe Systems Incorporated of San Jose, Calif.

In some examples, one or more publishers 190 (which can be geographically dispersed) can provide content streams (e.g., the stream 122) to the stream source 110 for incorporation into the playlist 120. A publisher can include any entity that creates, updates, distributes, owns or otherwise controls or manages multimedia content. The publishers 190 can include, for example, software developers. The publishers 190 can alternatively include, for example, end-users. In some examples, the publishers 190 can provide recorded or live content (e.g., from a webcam) to the stream source 110 for streaming to other users. In some implementations, the publisher 190 can be associated with the application 160 or another application.

While the application 160 is running and starts displaying a stream (e.g., the stream 122), several runtime and dynamic behaviors can come into play. For example, the application 160 can be deployed to various heterogeneous environments with varying degrees of network and system availabilities. The same application may be running at an environment with high bandwidth availability or at a bandwidth challenged end point not capable of receiving streams fast enough to display them at the rate at which the video is encoded. The system processing resources can also vary, for example, due to demands made by other applications.

To account for such runtime and dynamic behaviors, as well as for other client-side conditions, the dataflow 100 includes an event monitoring 170 phase. The event monitoring 170 can occur at various points in time throughout the dataflow 100 (including during the streaming 105). The event monitoring 170 can be periodic (e.g., every second, every 30 second, every 5 minutes, etc.) based on modifiable settings. The event monitoring 170 can be transparent to the end user, or it can be performed under the control and at the direction of the end user.

During the event monitoring 170, the player 150 can monitor and/or access various client-side conditions that can be used as a basis for dynamically altering 180 the playlist 120. For example, the event monitoring 170 can involve detecting and/or accessing runtime performance information 172 and/or information about user preferences 174. The runtime performance information 172 can include, for example, network bandwidth, client-side processing resources (e.g., processor usage), power conditions (e.g., low battery power, energy saving operating modes, etc.) client-side audio rendering capabilities (e.g., speaker capabilities, channel attributes (multi-channel, stereo, mono), supported frequencies, high-definition capability, etc.), client-side video rendering capabilities (e.g., supported resolutions, screen size, high-definition capability, etc.), and various other performance conditions associated with the client-side playback of the streams 122. The information about user preferences 174 can include, for example, user activity, viewing history and/or various other conditions that reflect user activity or preference. This information can include indications that a user clicked or otherwise selected a particular stream (e.g., a commercial) and/or an amount of time a user spent viewing certain content (e.g., a stream in the playlist). In some implementations, the user preferences can be implemented in the application 160. The runtime performance information 172 and/or user preferences 174 can be used to build up heuristics for the playlist alterations 180.

At various times during the dataflow 100, the player 150 can provide results of the event monitoring 170 to the application 160. The application 160 can be configured with control logic 165 that allows the application to make decisions about altering 180 the playlist 120. In some examples, this control 165 can be implemented using an API. The player 150 can provide the event monitoring results to the application 160 during playback of the playlist 120, and the application 160 can make dynamic decisions (using the control 165) about dynamically altering 180 one or more streams in the playlist 120, including a stream that is currently being played by the player 150. Although shown as part of the application 160, the control 165 can be included in the application 160, the player 150 or the application and the player. In some examples, one or more aspects of the control 165 can be distributed between the application 160 and the player 150 as a distributable library for other applications to embed inside them.

The application 160 can effect dynamic alterations 180 of the playlist, for example, by providing appropriate feedback 175 to the stream source 110. The feedback 175 can include requests for dynamic alterations 180 that are based on the event monitoring 170. The dynamic alterations 180 can involve any type of change to one or more streams in the playlist 120. Example alterations include, but are not limited to: replacing an item in the playlist with another before the start of the streaming or even in the middle while the original item is already streaming; reordering of the streams in the playlist; and removing one or more streams from the playlist; inserting a new stream into the playlist. Replacing a stream can involve switching a particular stream in the playlist to a different version of the stream (e.g., switching from 500 kbps video to 300 kbps video). Replacing a stream can also involve switching out a stream in the playlist for another stream having content unrelated to and/or different from content of the stream being replaced.

In some examples, the feedback 175 can effect alterations 180 that are responsive to degraded conditions, such as decreased network bandwidth, reduced power, reduced processing capability, and the like. In these situations, the alterations 180 can include replacing streams of the playlist 120 with downshifted or downgraded versions of the same content. For example, to avoid stuttering video resulting from a detected decrease in network bandwidth, the application 160 can request that the stream source 110 replace one or more streams of the playlist 120 with a lower bit rate version. As another example, the application 160 can request that the stream source 110 replace one or more streams of the playlist 120 with a lower definition version (e.g., high-definition to standard definition). Other example alterations 180 include switching from a full-screen version to a partial screen version (e.g., in a browser), switching from mixed audio/video to audio only (or video only), switching from a high resolution to a low resolution, and the like.

Conversely, to exploit the full capabilities of the client-side environment, the feedback 175 can effect alterations 180 that are responsive to improved conditions, such as increased network bandwidth, increased power, increased processing capability, etc. In these situations, the alterations 180 can include replacing streams of the playlist 120 with upgraded versions of the same content. For example, the application 160 can request that the stream source 110 replace one or more streams of the playlist 120 with a higher bit rate version. As another example, the application 160 can request that the stream source 110 replace one or more streams of the playlist 120 with a higher definition version (e.g., standard definition to high-definition). Other example alterations 180 include switching from a partial screen version (e.g., in a browser) to a full-screen version, switching from audio only (or video only) to mixed audio/video, switching from a stereo version to a multi-channel version, switching from a low resolution to a higher resolution, etc.

In addition to effecting alterations involving upgraded and downgraded versions of streams, the feedback 175 can effect alterations that replace streams in the playlist with unrelated or different streams having unrelated and/or different content. These types of alterations 180 can be responsive to detected user preferences, such as viewing history. For example, based on viewing history, the application 160 can decide that a first stream in the playlist 120 should be replaced with a second stream (which may not be in the playlist) unrelated to and/or different from the first stream. The first and second streams can be, for example, different commercials intended for different audiences.

To effect an alteration 180, the feedback 175 can include one or more requests that contain appropriate information identifying the desired change. For example, to effect a stream replacement, the feedback 175 can include a request that identifies the name of a stream currently in the playlist 120 as well as the name of a replacement stream. Upon receiving this request, the stream source 110 can look up the old stream name in the playlist and replace it with the new stream. If the stream source 110 is already streaming bits of the old stream, then it can compute the soonest time frame to switch to the new stream without causing any glitches or artifacts on the player 150 during playback.

Whether requesting upgraded/downgraded versions of streams or streams having unrelated and/or different content, the application 160 can include in the feedback 175 control information that specifies the type of switch desired and the desired behavior of the switch. This control information can be based on various heuristics built up from the event monitoring 170. The control information can be particularly useful in alterations that replace streams with other streams having unrelated or different content. For example, when the new and old streams are completely unrelated to each other, the application 160 and/or the player 150 may not wish to switch the streams if the stream source 110 has already started streaming the old stream, since doing so would cause an abrupt change of content during playback. Thus, the application 160 and/or the player 150 has control to specify if the playlist stream should be switched as a whole or in parts. The player 150 and the stream source 110 can also have control capability to specify insertion or deletion modes for the playlist 120, such that the new stream can be inserted before or after the old stream or the old stream is deleted from the playlist. The stream source 110 and the player 150 can also have the capability to specify start points or offsets and the length of the new stream which should replace the old stream.

In some implementations, playlists (e.g., the playlist 120) can be created at the client (e.g., by a client-side application) and altered at a server (e.g., the stream source 110) that streams content over the network. Various other implementations are within the scope of this disclosure as well. For example, the playlist can be created initially at a media server and then downloaded to the client and altered at the client. As another example, the playlist can be created initially at the server and then downloaded to the client. The playlist can then be altered at the server, and the altered version can be provided to the client. In yet another implementation, the playlist can be hosted by a server other than the server performing the streaming. For example, one sever can perform streaming while another can host the playlist and alteration logic.

Figure 2:
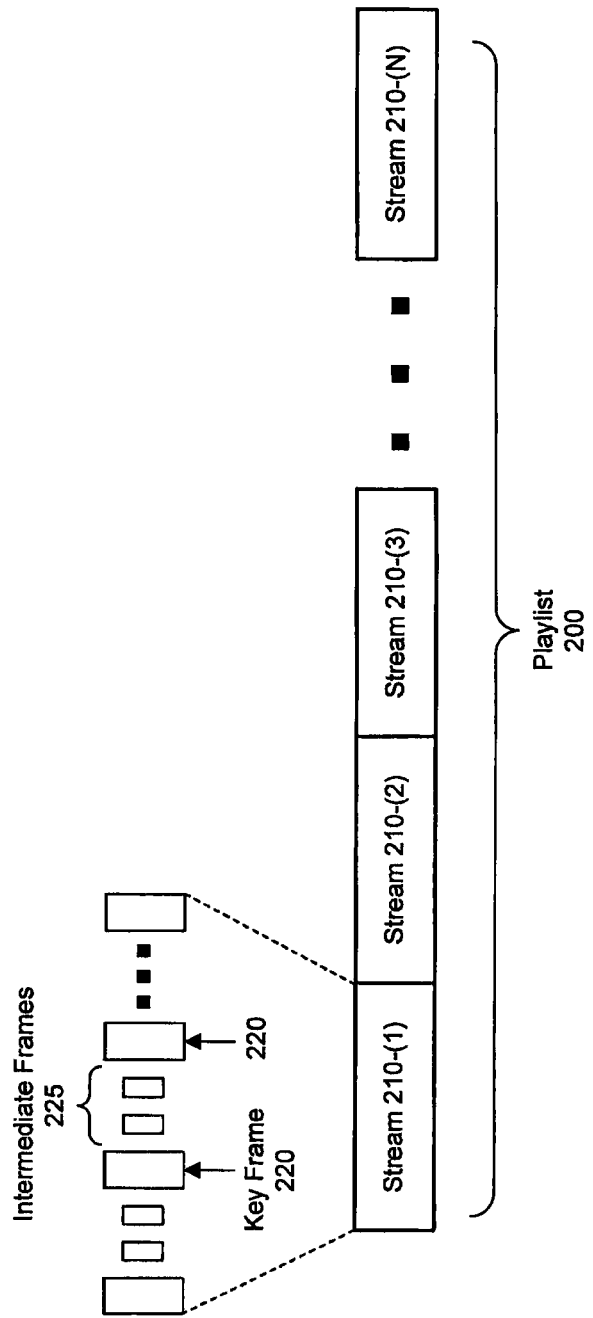
FIG. 2 is a block diagram showing a conceptual overview of a playlist.

FIG. 2 shows an example playlist 200 consistent with at least some implementations. FIG. 2 is an example only, and other playlist implementations are within the scope of this disclosure. As shown in the figure, the playlist 200 can include one or more streams 210(1)-210(N). Each of the streams 210 can include audio content, video content or both. The streams 210 can include content encoded with one or more codecs (e.g., the H.264, On2 VP6, and/or Sorenson Spark video codecs). The playlist 200 can be implemented in XML, ActionScript or any other suitable language. The playlist 200 can be maintained by a streaming media server (e.g., the Adobe® Flash® Media Server system, available from Adobe Systems Incorporated of San Jose, Calif.), and each stream 210 in the playlist 210 can correspond to a file (e.g., SWF files, FLV files and/or F4V files) maintained by or accessible to the media server. Playlists can be maintained internally in one or more data structures (e.g., FMS data structures) in response to commands from the player application.

In some implementations, the streams 210 can include one or more digital streams that are encoded with one or more key frames 220 as well as intermediate information for changing the key frame to reproduce the intermediate or delta frames 225 between the key frames. During playback of the stream, the encoded stream can be decompressed and decoded. The key frames 220 can include portions of the content and can provide information needed during decompression to appropriately update the display (e.g., to reflect changes in the content, such as image movement). The intermediate information included in the stream can provide updates that can incrementally reproduce the content. The stream 210 can include a new key frame 220 whenever the content of the stream (e.g., video) cannot be reproduced from the previous key frame using the intermediate information.

In some implementations, the playlist 200 can be associated with a timeline. The timeline can divide the total running time of the playlist 200 into segments or frames. Each of the streams 210 of the playlist 200 can be placed on the timeline at a specified location on the timeline. In some examples, the playlist 200 can be implemented in a list-type data structure stored on a server. Each stream 210 in the playlist 200 can have a begin time and an end time. The streams of the playlist can be set end to end to build up a composite timeline.

In some implementations, altering playlists can involve altering content and timelines associated with the playlists. For example, when a new stream is incorporated into a playlist, the original timeline can be reordered according to the new stream. Thus, if a particular stream is switched with a shorter stream, then the corresponding timeline can be shortened.

Figure 3:
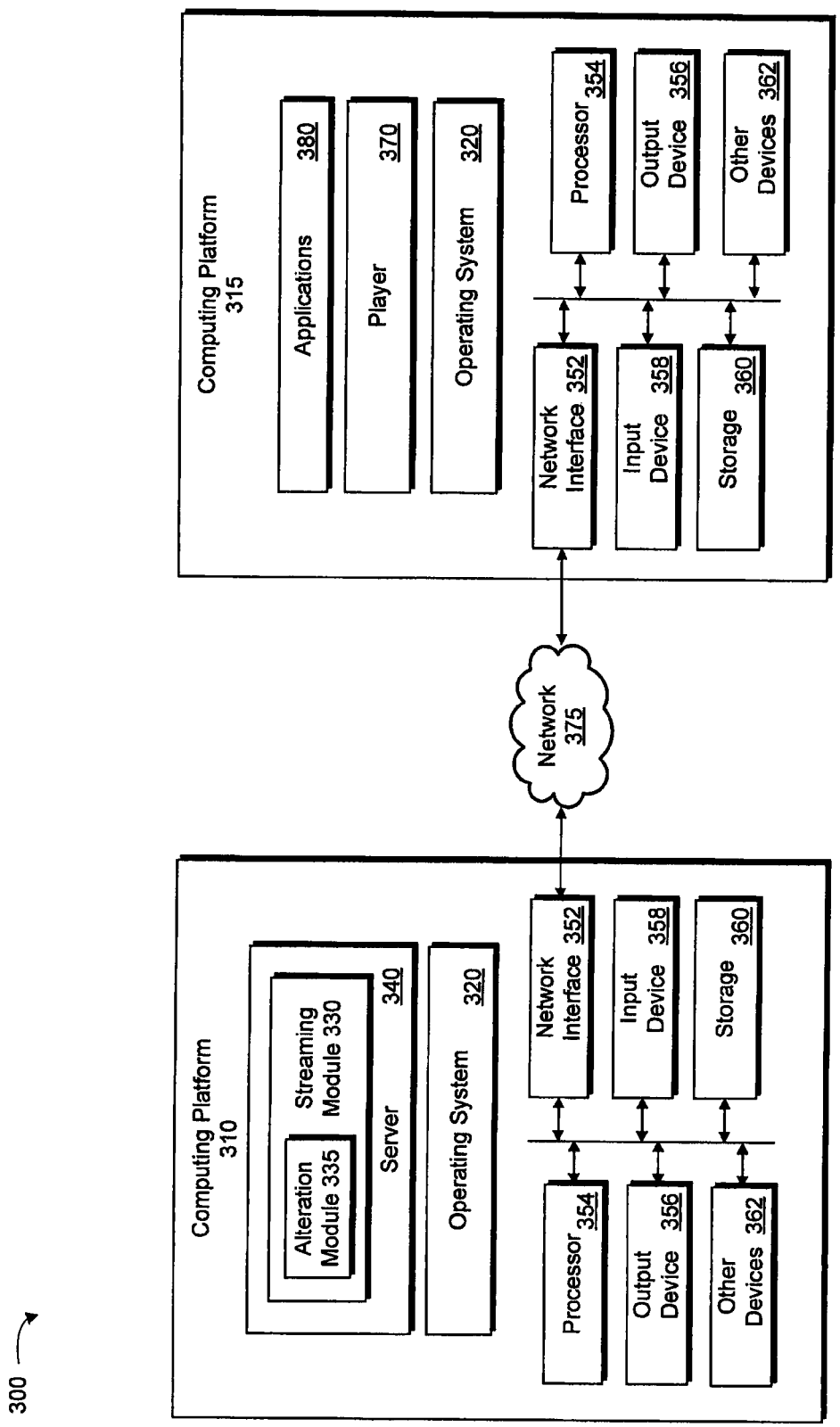
FIG. 3 is a block diagram showing an example data processing environment.

FIG. 3 shows an example data processing environment 300 in which a playlist can be dynamically altered. Separate computing platforms 310 and 315 each include hardware and software. The computing platform 310 can be configured as a streaming media server, while the platform 315 can be configured as a playback client (e.g., an end-user computer). The client 315 can include, for example, a personal computer or workstation, a laptop, a mobile phone, a set-top box, a handheld device, or any other suitable device that can accommodate playback functionality.

The computer platforms 310 and 315 can be geographically dispersed and operatively coupled via a network 375. The network 375 can include one or more telecommunications networks, such as computer networks, telephone or other communications networks, the Internet, etc. The network 375 can include a shared, public, or private data network encompassing a wide area (e.g., WAN) or local area (e.g., LAN).

In the example configuration shown in FIG. 3, hardware on the computer platforms 310 and/or 315 can include one or more of a network interface 352, a processor 354, an output device 356, an input device 358, a storage 360 and other devices 362. One or more system buses can interconnect these components. The number, identity and arrangement of these elements are not limited to what is shown, and additional and/or different elements can be contained in or coupled with the elements shown. Further, the platforms 310 and 315 can include fewer components than what is shown. Although depicted with similar components, the platforms 310 and 315 can be configured differently, each platform having additional, fewer or different elements than what is shown in the figure. For example, the client platform 315 can be a mobile device with fewer or different components from what is included in the server 310.

The network interface 352 facilitates connectivity with a network, such as the network 375. Network interface 352 can be any appropriate wireline (e.g., IEEE (Institute of Electrical and Electronics Engineers, Inc.) 1394, Universal Serial Bus (USB), etc.) or wireless (e.g., IEEE 802.11™, BLUETOOTH®, IrDA®, etc.) mechanism for facilitating unidirectional or bidirectional transmission of data between the computer platform and the network 375. The network interface 352 can include one or more network cards and/or data and communication ports.

The processor 354 can execute instructions from storage, route information among components of the computer platform, and/or perform various operations on data. Each of the platforms 310 and 315 can include any number of general- and/or special-purpose processors, which can operate collaboratively or independently. In some examples, the processor 354 can include one or more application specific integrated circuits (ASICs) and/or various other circuitry. The processor 354 can include various logical elements and architectures (e.g., the von Neumann architecture, parallel architectures, etc.) and can perform various types of computational operations, such as sequential computation and parallel computation.

The output device(s) 356 can present text, images, video, audio, or any other type of information. Examples of the output device 356 include, video display devices, audio display devices, printers, and the like. The output device 356 can display user interface information for various software applications and tools running on the computer platform, as well as the operating system programs necessary to operate the system. The output device 356 can present information by way of a cathode ray tube, liquid crystal, liquid crystal on silicon, light-emitting diode, gas plasma, laser, or other type of display mechanism. The output device 356 can also be configured to receive, generate and/or present holographic or other visual representations. The output device 356 can be configured to audibly present information, and it can include suitable components for receiving and presenting audio signals. Each of the platforms 310 and 315 can include any number of similar or different output devices.

The input device(s) 358 can include components such as a keyboard, a mouse, a stylus, a pointing device, a joystick, and/or a touch screen. The input device 358 can also include audio- or video-capture devices (e.g., video cameras, microphones, etc.) and/or various sensors for capturing and processing emissions (e.g., thermal, motion, sound, etc.). It can also include one or more information reading devices (e.g., scanners, disk drives, etc.) and/or input ports. Each of the platforms 310 and 315 can include any number of similar or different input devices. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The storage 360 can provide mass storage, working (e.g., cache) memory, and/or buffer space for the system. The storage 360 can be implemented using a variety of suitable memory elements. The memory elements can include, for example, solid state elements, optical elements, polymer elements, magnetic elements, and/or organic elements (e.g., crystals). The memory elements can be volatile or non-volatile and can be randomly or sequentially accessed. The storage 360 can include random access memory (RAM), flash RAM, read-only memory (ROM), erasable programmable read-only memory (EPROM), and electrically erasable programmable read-only memory (EEPROM). The storage 360 can include one or more fixed disk drives (e.g., a hard drive, RAID storage, etc.) and one or more removable disk drives (e.g., a CD-ROM drive, DVD drive, etc.). The storage 360 can also include one or more data repositories (e.g., relational, distributed and/or object-oriented databases), which can be local and/or remote to the platform. In some examples, the storage 360 can include one or more local and/or remote network-based storage architectures, such as a storage area network (SAN). Each of the platforms 310 and 315 can include or interact with any number of individually configured storage elements 360.

The storage 360 can store program code for various applications, an operating system 320, an application-programming interface, application routines, middleware components, and/or other executable instructions. The storage 360 can include program code and information for communications (e.g., TCP/IP communications), middleware components, kernel and device drivers, invariant low-level systems code, data for basic input and output, and various configuration information.

In some implementations, the storage 360 includes at least one computer readable medium, which tangibly embodies one or more computer programs. The computer programs can contain instructions that, when executed by a processor, implement various methods (such as those described below) and/or systems. Computer readable medium refers generally to any type of computer program, apparatus and/or device (e.g., magnetic discs, optical disks, memory, Programmable Logic Devices (PLDs)) used to provide machine instructions and/or data to a processor. Computer readable media suitable for storing computer programs and data can include forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

The other devices 362 can include, for example, various devices used for video and film editing. Examples include video controllers, video recorders, audio recording systems, backup power supplies, etc. Moreover, the other devices 362 can include any digital print engine or marking engine, display monitor, or other raster output device capable of producing color or gray scale pixels on paper, film, display screen, or other output medium.

As shown in FIG. 3, the server platform 310 includes an operating system 320 and a streaming module 330, which can include and/or leverage an alteration module 335. The operating system 320 can include any suitable operating system (OS) for managing computing resources and hosting applications (e.g., WINDOWS® OS, MAC® OS, UNIX® OS, LINUX®OS, and the like).

The streaming module 330 can include any suitable component for building playlists and streaming content associated with playlists over the network 375. The streaming module 330 can be implemented in or part of a server module or application 340, which can be configured to interact with and service components of the client platform 315 (e.g., the player 370). The streaming module 330 can be configured to receive digital media and stream the received media to the client platform 315 over the network 375 according to various protocols. The streaming module 330 can be configured to store and/or access one or more playlists (e.g., the playlist 200) and stream content streams (e.g., the streams 210(1)-210($n$)) in those playlists to the client platform 315. In some examples, the playlists and the associated content streams can be stored locally on the server platform 310 (e.g., in the storage 360). The playlists can also be distributed across different machines as in the server's edge/origin configuration.

In some examples, applications can make calls to the server platform 310 to add individual content streams into a particular playlist (e.g., the playlist 120). The applications can provide the content streams along with the requests or can provide information identifying locations of the streams. The streaming module 330 can obtain these streams and append them one after the other in the playlist. The streaming module 330 can then deliver the bits of these streams to the client platform 315 when the content is streamed.

In some examples, the streaming module 330 can receive streams that have already been formatted using one or more codecs. In some examples, the streaming module 330 can receive unformatted (e.g., uncompressed) media (e.g., a live video feed from a user's webcam) and can be configured to format the received media into content streams using one or more codecs. Thus, in some implementations, the streaming module 330 can include and/or leverage one or more codes (such as the H.264 codec, the On2 VP6 codec, the Sorenson Spark codec, etc.) to compress received streams for streaming to the client platform 315. In some implementations, the streaming module 330 can receive a live video feed that is already encoded in a specific codec and the streaming module 330 can change that codec type when streaming the feed to a client.

The streaming module 330 can receive media through one or more interfaces and transmit content streams via one or more other interfaces. The streaming module 330 can be configured to transmit content streams (e.g., live video or other live streams) at various transmission rates, resolutions, formats, etc. The particular manner in which the content streams are streamed can depend on the alteration module 335.

The alteration module 335 can process requests for dynamic alterations from the client platform 315 received over the network 375. The alteration module 335 can be configured to receive these requests and take appropriate action to effect changes in playlists, which can be stored locally on the server platform 310 (e.g., in the storage 360). For example, the alteration module 335 can look up identified streams in a playlist and replace the streams with other streams. The alteration module 335 can also be configured, for example, to rearrange streams in a playlist, add streams to a playlist and/or remove streams from a playlist. In some examples, the alteration module 335 can include functionality for computing the appropriate time frame for switching streams without causing glitches or artifacts in the playback. Additionally, in some examples, the alteration module 335 can include functionality for specifying insertion and deletion modes for playlists, such that new streams are inserted before or after old streams or the old streams are deleted from the playlists. The alteration module 335 can also specify start points or offsets and lengths of new streams.

In some implementations, the alteration module 335 (or another component of the server platform 310) can include and/or access one or more buffers. In some examples, the alteration module 335 can be configured to initiate or trigger the buffering of streams in order to facilitate playlist alteration. For example, when switching between live streams, the alteration module 335 can begin buffering the streams when the switch is initiated and then compute the appropriate point for switching the streams.

The streaming module 330 and the alteration module 335 can include and/or use one more data structures as well as one or more computational algorithms that can operate on various data. The modules can include sets of instructions for performing various tasks, and the modules can output information for use by users or other systems. In some implementations, the modules can include one or more engines, which can output code that serves as input to other systems, engines or processes. The modules can include and/or use various hardware and firmware elements.

The client platform 315 can include a suitable operating system 320, a player 370 and one or more applications 380. The player 370 can include client-based software that runs Flash® and/or other applications and supports vector and raster graphics, bidirectional streaming of audio and video and one or more scripting or other languages (e.g., JavaScript, ActionScript, and the like). In some examples, the applications 380 (e.g., a Flash®-based application) can rely on the player 370 during operation. Further, the player 370 can integrate Flash® and other applications with the operating system 320 to provide various functionality and features to the client platform 315. In some examples, the player 370 can be implemented as a virtual machine. The player 370 can include, for example, the Adobe® Flash® Player runtime.

The player 370 and the applications 380 are not limited to the Flash® platform or Flash®-based applications. The player 370 can be implemented and run in, and/or configured to run and/or support applications created with, various other platforms and environments without departing from the scope of this disclosure.

In some examples, the player 370 can be implemented as an independent component that runs on the client platform 315 and/or as an embedded component. In some implementations, the player 370 can be configured to run in conjunction with a Web application. In some examples, the player 370 can be implemented as a "plug-in" type component that provides various functionality to, and extends the feature set of, one or more host applications (e.g., an application 380). Such host applications can provide services to the plug-in to allow the plug-in to interact with the host application. The host applications and/or the OS can include APIs that allow plug-ins to be added and interact with the host applications.

These applications 380 can include various computer programs, which contain instructions executable by one or more processors (e.g., the processors 354). Computer programs consistent with this disclosure can be implemented in various programming languages, such as high- or mid-level procedural and object-oriented programming languages (e.g., C, C++, Java, JavaScript, PHP, Visual Basic, etc.), low-level assembly languages (Intel 80×86, ARM, etc.) and/or various other languages.

In some implementations, the client platform can include a runtime environment that provides various utility services for use by the applications 380. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provide using a runtime library. Moreover, the runtime environment can include an API that provides services to applications and abstracts details of various hardware and OS platforms on which the runtime environment has been configured to operate.

The discrete modules (e.g., the modules 330, 335 and 370) shown in FIG. 3 are used herein for purposes of explanation only, and various other arrangements are within the scope of this disclosure. For example, the various functionality of these modules can be distributed or exist in more or less modules than what is shown in the figure. The particular configuration, arrangement and feature set of the individual modules will typically depend on the particular operating environment.

Figure 4:
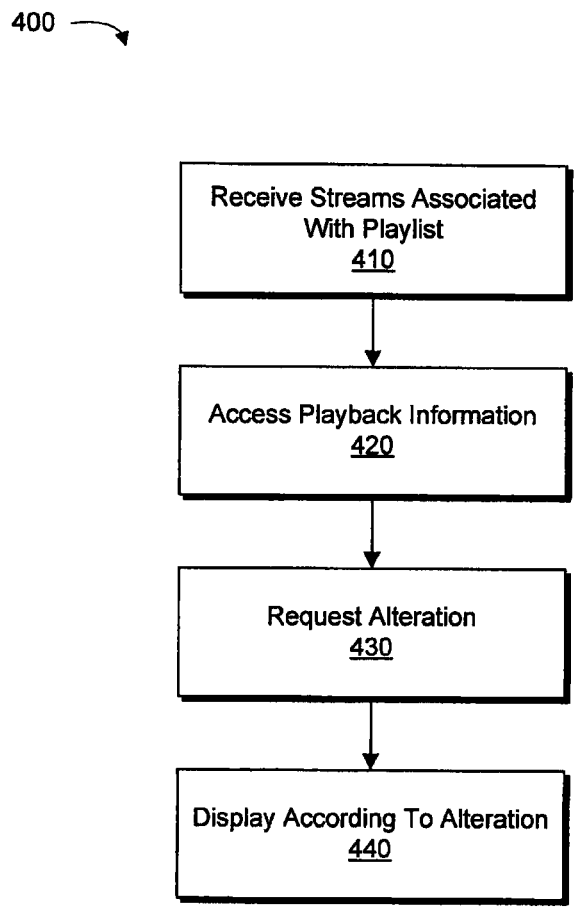
FIG. 4 is a flow diagram showing an example playlist alteration process.

FIG. 4 is a flow diagram showing an example application update distribution process 400 consistent with this disclosure. The process 400 can be performed by one or more elements in the data processing environment 300. The process 400 can be performed by one or more processors (e.g., the processor 354 in the client platform 315) executing one or more instructions from storage. The process 400 can involve receiving 410 streams associated with a playlist; accessing 420 client-side playback information; requesting 430 an alteration of the playlist; and displaying 440 the streams of the playlist according to a playlist alteration responsive to the request.

The process 400 can receive 410 streams associated with playlist. This can involve a client (e.g., the client platform 315) receiving streams (e.g., the streams 210) of a playlist (e.g., the playlist 220) from a server (e.g., the server 310). In some examples, the received playlist can be created by a client-side application. The client-side application can interact with and send requests to the server to build the playlist.

The playlist can include an ordering of streams that are queued for client-side playback from the server according to the ordering. In some implementations, the playlist can be stored locally on the server-side.

The streams associated with the playlist can include, for example, audio streams, video streams, and mixed streams having both audio and video. In some examples, the streams of the playlist can include live streams. For example, the streams can include streams from an information capture device (e.g., a video camera) that is recording a live football game. The playlist can include a mix of live streams and recorded streams. As an example, the playlist can include live streams of a football game being recorded mixed with pre-recorded streams corresponding to commercials or advertisements. In some examples, the streams associated with the playlist can include various data content, such as text data, still image data and/or other user defined marshaled (e.g., serialized for transmission) data formats.

The process 400 can access 420 client-side playback information. This can involve, for examples, accessing client-side conditions that are associated with the receipt and playback of at least one of the streams associated with the playlist. Accessing 420 client-side playback conditions can involve accessing runtime performance information and/or user preferences. As explained above, the runtime performance information can include, for example, network bandwidth, client-side processing resources, power conditions, client-side audio rendering capabilities, client-side video rendering capabilities, and various other performance conditions associated with the client-side playback of the received streams. The user preference information can include, for example, user activity, viewing history and/or various other conditions that reflect user activity or preference. This information can include indications that a user clicked or otherwise selected a particular stream and/or an amount of time a user spent viewing certain content.

In some examples, accessing 420 client-side playback information can involve monitoring (e.g., by the player 370 on the client platform 315) client-side conditions. The monitoring can occur periodically, either independently of the user of the client device or at the direction of the user. The player 370, for example, can track the client-side conditions and provide the information to a client-side application, which can make decisions about altering the playlist based on built up heuristics.

The process 400 can request 430 an alteration of the playlist in response to the accessed client-side playback conditions. This can involve, for example, a client-side application sending the server a request for an alteration of the streams of the playlist. In some examples, the request can identify a desired playlist alteration and can include information that controls the playlist alteration.

Various types of alterations can be requested. For example, the process 400 can request a reordering of the multimedia streams in the playlist, a removal of a stream from the playlist, and/or an insertion of a new stream into the playlist. The request can include various information that specifies how the alteration should be carried out. For example, with reordering, the request can include information that specifies an old ordering and a new ordering. In some examples, the reordering request can include information that specifies a stream name and a desired movement of the stream in the playlist ordering. For removals and insertions, the request can include an identification of the stream(s) to be removed or inserted. For insertions, the request can further identify a desired location in the playlist where the new stream should be placed.

Playlist alterations can involve replacing one or more streams in the playlist with different versions of those streams (but having the same content) that require different resources and capabilities than the stream(s) being replaced. For example, alteration of the playlist can include replacing streams with upgraded or downgraded versions of the streams. Playlist alterations can also involve replacing a stream in the playlist with an unrelated or different stream having content unrelated to and/or different from content of the stream being replaced. In such cases, the alteration requests can include old and new stream names and information about whether the streams can be switched at intermediate points.

In some examples, playlist alterations can affect a stream that is currently being played back. In such situations, control information from the alteration requests can be used to appropriately perform the alteration. For example, the client-side application requesting the alteration can specify in the request how to treat currently playing streams (e.g., whether or not to replace the currently-playing stream at an intermediate position). The streaming source (e.g., the server platform 310) can use this information to effect the alteration. In some examples, when currently-playing streams are manipulated (e.g., switched), the streaming source can perform the alteration such that playback of the currently-playing stream appears uninterrupted. Additional details of this functionality is discussed below in connection with FIGS. 5-7.

In some implementations, requesting 430 an alteration of the playlist in response to the accessed client-side playback conditions can involve identifying all relevant streams in the playlist that are potentially affected by the conditions. For example, if the network is providing 300 kbps bandwidth, the requesting 430 can involve identifying all streams associated with bit rates higher than 300 kbps. The process 400 can request 430 a switch from the high bit rate video streams queued up in the playlist to their lower bit rate versions. The requesting 430 can also involve identifying streams in the playlist that can be upgraded due to increased network bandwidth or other resource improvement. If the network is providing 500 kbps bandwidth, for example, the requesting 430 can involve identifying all streams in the playlist associated with bit rates lower than 500 kpbs. The process 400 can then request 430 a switch from these low bit rate versions to their higher bit rate versions.

The process 400 can display 440 received streams of the playlist according to a playlist alteration responsive to the request. This can involve the client presenting to the end-user (e.g., via a display device) streams of the playlist according to a requested alteration. For example, if a downgrade was requested, the displaying 440 can involve displaying the downgraded streams (e.g., at a lower bit rate or resolution). If an upgrade was requested, the displaying 440 can involve displaying the upgraded streams.

Figure 5:
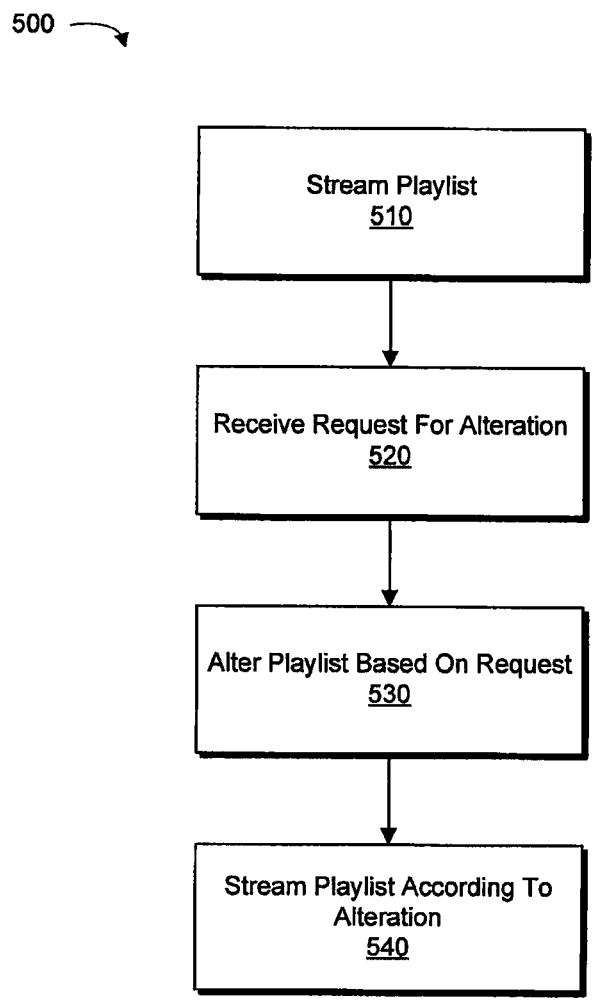
FIG. 5 is a flow diagram showing another example playlist alteration process.

FIG. 5 is a flow diagram showing another example playlist alteration process 500, which can represent server-side operations. The process 500 can be performed by one or more elements in the data processing environment 300. The process 500 can be performed by one or more processors (e.g., the processor 354 in the server platform 310) executing one or more instructions from storage. The process 500 can involve streaming 510 a playlist; receiving 520 a request for a playlist alteration; altering 530 the playlist based on the received request; and streaming 540 the playlist according to the alteration.

The process 500 can stream 510 a playlist. This can involve a server (e.g., the server platform 310) streaming media/content streams (e.g., the streams 210) associated with a playlist (e.g., the playlist 200) to a client (e.g., the client platform 315). The playlist can be created by a client-side application and can include an ordering of streams that are queued for client-side playback according to the ordering. The playlist can be maintained locally on the server-side.

The process 500 can receive 520 a request for a playlist alteration. This can involve receiving, from the client-side application, a request for an alteration of the playlist responsive to detected client-side conditions. The receiving 520 can involve, for example, receiving a request generated at stage 430 of the process 400 discussed above. As explained above in connection with the process 400, the request can identify a desired playlist alteration and include information that controls the playlist alteration.

The process 500 can then alter 530 the playlist based on the received request. This can involve the server (e.g., the server platform 315) altering the playlist based on control information provided in the request. For example, the altering 530 can involve determining whether a currently-playing stream can be switched at an intermediate location in the stream. The altering 530 can involve looking up stream names identified in the request and performing alterations specified in the request. For example, the altering 530 can involve looking up an old stream and a new stream and then replacing the old stream with the new stream. The process 500 can then stream 540 the content streams associated with the playlist according to the alteration. For example, the process 500 can stream 540 upgraded or downgraded versions of streams in the playlist. The process 500 can stream 540 new streams added to the playlist, stop streaming certain streams that were removed from the playlist, and/or stream content streams of the playlist in an order different from what was previously in the playlist.

In some examples, the altering 530 can involve identifying all relevant streams that should be switched. For example, if the alteration request included a request for a downgraded version of a stream to decreased network bandwidth or other resource degradation, the altering 530 can involve parsing the playlist to identify all other streams in the playlist potentially affected by these conditions. For example, if the network is providing 300 kbps bandwidth, the altering 530 can parse the playlist and identify all streams associated with bit rates higher than 300 kbps. The process 500 can switch the identified high bit rate video streams queued up in the playlist to their lower bit rate versions. Conversely, the altering 530 can involve identifying streams in the playlist that can be upgraded due to increased network bandwidth or other resource improvement. If the network is providing 500 kbps bandwidth, for example, the altering 530 can involve identifying all streams in the playlist associated with bit rates lower than 500 kpbs. The process 500 can then switch these low bit rate versions to their higher bit rate versions.

In some implementations, the process 500 can involve buffering and introducing delay into streams (e.g., during the altering 530). For example, when switching between two live streams, the process 500 can begin buffering both streams when the switch is initiated. During the buffering, the process 500 can identify a suitable point for switching the streams. The buffering can allow the stream switching to occur without causing any glitches or artifacts in the playback.

Figure 6:
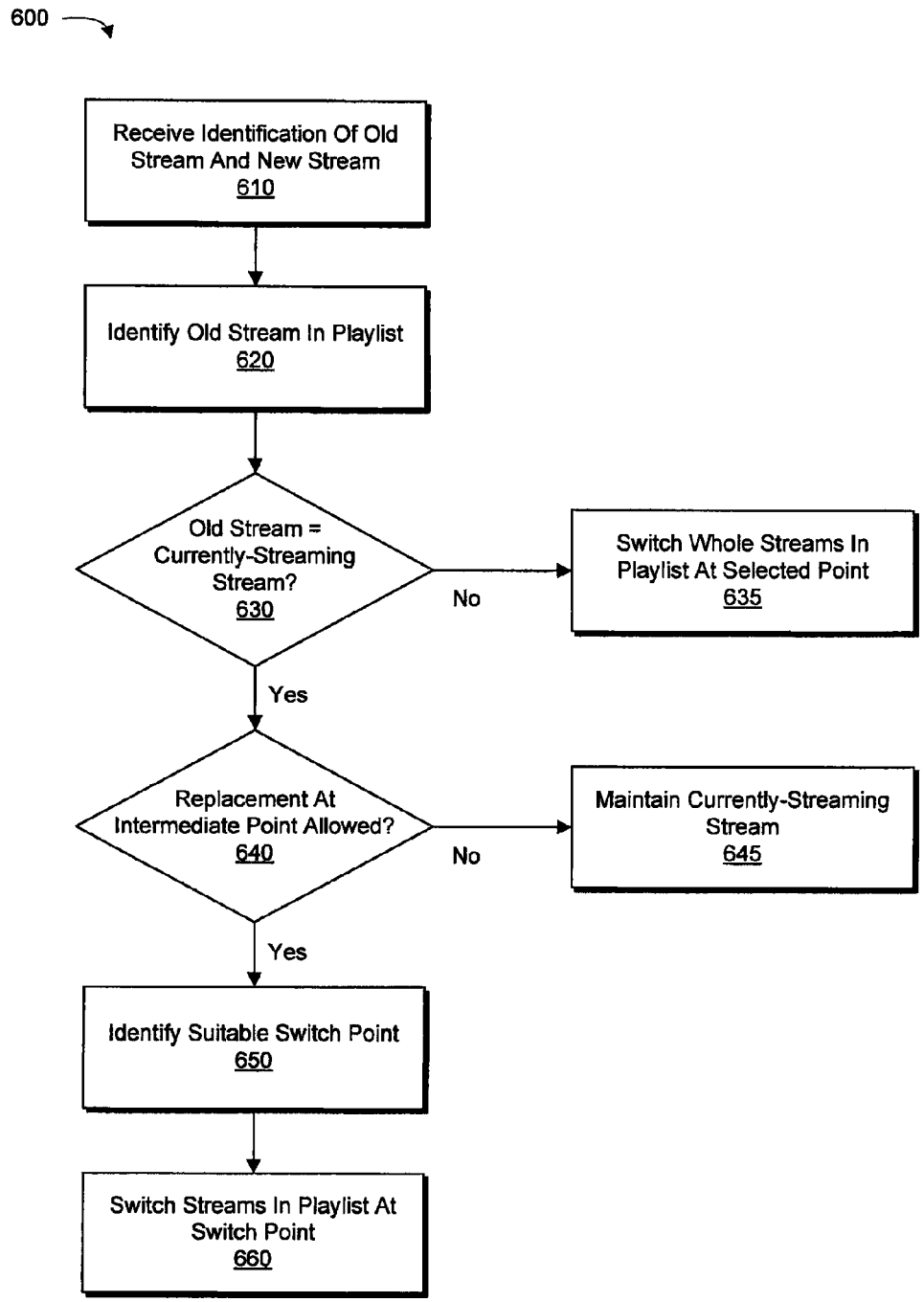
FIG. 6 is a flow diagram showing an example stream replacement process.

FIG. 6 is a flow diagram showing an example stream replacement process 600. The process 600 can represent operations performed as part of the alteration stage 530 of the process 500 discussed above. The process 600 can be performed by one or more elements in the data processing environment 300. The process 600 can be performed by one or more processors (e.g., the processor 354 in the server platform 310) executing one or more instructions from storage.

The process 600 can receive 610 an identification of an old stream and an identification of a new stream. These identifications can be included in a playlist alteration request sent to the server platform 310 from the client platform 310. The request can include a request to switch an old stream in the playlist to a new stream.

The process 600 can identify 620 the old stream in a playlist using the information from the alteration request. The process 600 can then determine 630 whether the old stream is currently being played back (e.g., the old stream is the currently-streaming stream). For example, the process 600 can determine if the player 370 is currently presenting the stream identified as the old stream (e.g., the server is currently streaming to the client the stream identified as the old stream). If the old stream is not the currently-streaming stream, then the process 600 can switch 635 the old stream in its entirety with another stream at a selected point in the playlist. The selected point can be specified in the alteration request, which can be sent from the client-side, or it can be determined at the server-side.

If the identified old stream is the currently-streaming stream, then the process 600 can determine 640 whether replacement of the stream at an intermediate point is allowed. That is, the process 600 can determine whether it can interrupt the currently-streaming stream before it is finished playing to switch the stream to the new stream. This determination can be made based on control information specified in the alteration request. If intermediate replacement is not allowed, then the process 600 can maintain 645 the currently-streaming stream until completion.

If intermediate replacement is allowed, then the process 600 can identify 650 a suitable point for switching the streams. The process 600 can identify 650 a suitable such that the switch does not cause any glitches or artifacts in the playback. The process 600 can then switch 660 the old stream to the new stream at the identified switch point. This can involve removing the old stream from the playlist and inserting the new stream in its place in the playlist.

Figure 7:
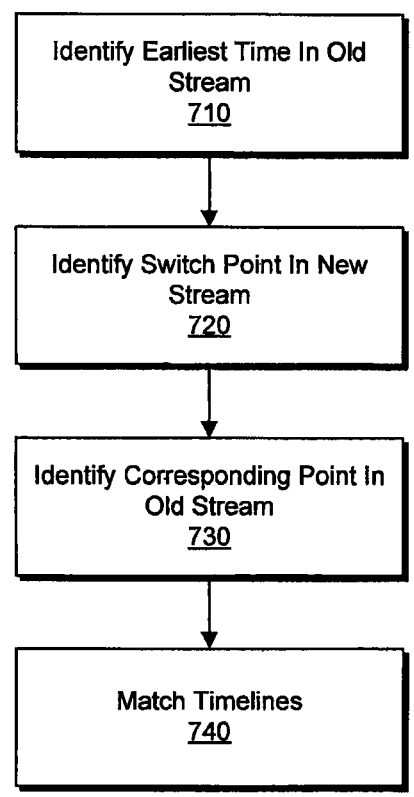
FIG. 7 is a flow diagram showing example aspects of an example stream replacement process.

FIG. 7 is a flow diagram showing an example process 700 for identifying a suitable switch point. The process 700 can represent operations performed as part of the identification stage 650 of the process 600 discussed above. As with the process 600, the process 700 can be performed by one or more elements in the data processing environment 300. The process 700 can be performed by one or more processors (e.g., the processor 354 in the server platform 310) executing one or more instructions from storage.

The process 700 can identify 710 an earliest time in the old stream (which is the currently-playing stream) for switching the stream. This can involve identifying in the currently-playing stream an earliest key frame. The earliest key frame can be, for example, the earliest key frame that has not yet been transmitted to the client. In some examples, the alteration module 335 in the server platform 310 can identify the earliest key frame. The process 700 can then identify 720 a point in the new stream to make the switch. This can involve identifying a key frame in the new stream. In some examples, the process 700 can identify 720 in the new stream a key frame that occurs subsequent to the earliest key frame identified in the currently-playing stream. The process 700 can then identify 730 a point in the old stream (the currently-playing stream) corresponding to the identified switch point in the new stream. This can involve identifying a key frame or an intermediate frame in the old stream that corresponds to the identified key frame in the new stream.

In some implementations, the process 700 can match 740 timelines of the streams to effect steam switching. For example, the process 700 can match up audio and video timelines to ensure that the switch appears smoothly to the end-user. In some implementations, various switching policies can be used when altering playlists. For example, if the audio and video timelines between the two sets of content do not match, a preference can be made to use the audio timeline, to avoid glitches in the audio timeline. If audio is not available near the desired switch point, only the video timeline may be used. This particular switching policy is not intended to be restrictive, and various other switching policies can be used without departing from the scope of this disclosure.

The sequences of events shown in FIGS. 4-7 are examples and not intended to be limiting. Other processes can therefore be used and, even with the processes 400, 500, 600 and 700 depicted in FIGS. 4-7, events can be re-ordered, added and/or removed. Furthermore, the elements of the processes can overlap and/or can exist in fewer stages than the number shown in the figures. In some examples, processes can be re-arranged and configured to accommodate and/or exploit multitasking and parallel processing techniques and/or other aspects of various system architectures.

Although the foregoing description refers to streaming, aspects of this disclosure can apply to other media delivery techniques. For example, aspects of this disclosure can be used to alter playlists that are progressively delivered (e.g., progressively downloaded). In these implementations, a playlist can include an ordering of content queued for consumption, whether streaming or progressively delivered. In progressive delivery implementations, content (e.g., SWF files, FLV files, F4V files, etc.) associated with playlists can be downloaded to a client (e.g., the client platform 315) from a server (e.g., the server platform 310), with the client including appropriate logic for making playlist alteration decisions and altering the playlists.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. In some examples, a different series of APIs can be used to achieve certain results without departing from the scope of this disclosure. For instance, a richer set of APIs for manipulating playlists can be used. As another example, different algorithms can be used to control how to switch content based on either different metrics on a player, or different technology for switching between content streams.

What is claimed is:

1. A computer-implemented method, comprising:
   receiving, from a server, streams associated with a playlist, the playlist including an ordering of streams that are queued for transmission from the server to a client for client-side playback from the server according to the ordering;
   accessing client-side playback conditions associated with the receipt and playback of at least one of the streams;
   requesting, by a client-side application, to replace on the playlist a currently-playing stream with a new stream in response to the client-side playback conditions, the request identifying the currently-playing stream and the new stream and including information that specifies whether or not to replace the currently-playing stream at an intermediate position;
   receiving, from the server, the streams according to a playlist alteration made at the server in response to the request from the client; and
   displaying the streams of the playlist according to the playlist alteration;
   wherein accessing client-side playback conditions comprises accessing client processing capability and one or more of the following: network bandwidth availability and user viewing statistics;
   wherein the request includes at least one of a removal of a stream from the playlist and an insertion of another new stream into the playlist at a client specified insertion point in the playlist.

2. The method of claim 1, wherein the streams of the playlist include at least one of: audio streams, video streams, mixed streams having audio and video, text-based data, still image data or user-defined data.

3. The method of claim 2, wherein the streams include live streams.

4. The method of claim 1, wherein the new stream comprises a different version of the currently-playing stream, the different version requiring different network and processing resources than the currently-playing stream.

5. The method of claim 1, wherein the new stream comprises a different stream having different content than content of the currently-playing stream.

6. The method of claim 1, wherein the playlist is created by the client-side application.

7. A computer program product, encoded on a non-transitory computer-readable medium, operable to cause data processing apparatus to perform operations comprising:
   receiving, from a server, streams associated with a playlist, the playlist including an ordering of streams that are queued for transmission from the server to a client for client-side playback from the server according to the ordering;
   accessing client-side playback conditions associated with the receipt and playback of at least one of the streams;
   requesting, by a client-side application, to replace on the playlist a currently-playing stream with a new stream in response to the client-side playback conditions, the request identifying the currently-playing stream and the new stream and including information that specifies whether or not to replace the currently-playing stream at an intermediate position;
   receiving, from the server, the streams according to a playlist alteration made at the server in response to the request from the client; and
   displaying the streams of the playlist according to the playlist alteration;
   wherein accessing client-side playback conditions comprises accessing client processing capability and one or more of the following: network bandwidth availability and user viewing statistics;
   wherein the request includes at least one of a removal of a stream from the playlist and an insertion of another new stream into the playlist at a client specified insertion point in the playlist.

8. The computer program product of claim 7, wherein the streams of the playlist include at least one of: audio streams, video streams, mixed streams having audio and video, text-based data, still image data or user-defined data.

9. The computer program product of claim 8, wherein the streams include live streams.

10. The computer program product of claim 7, wherein the new stream comprises a different version of the currently-playing stream, the different version requiring different network and processing resources than the currently-playing stream.

11. The computer program product of claim 7, wherein the new stream comprises a different stream having different content than content of the currently-playing stream.

12. The computer program product of claim 7, wherein the playlist is created by the client-side application.

13. A computer-implemented method, comprising:
streaming media streams associated with a playlist to a client, the playlist including an ordering of streams that are queued for transmission to the client for client-side playback at a client-side application according to the ordering;
receiving, from the client-side application, a request for a replacement on the playlist of a currently-streaming stream with a new stream responsive to detected client-side conditions, the request identifying the currently-streaming stream and the new stream;
replacing on the playlist the currently-streaming stream with the new stream based on the received request, the currently-streaming stream being replaced at an earliest key frame in the new stream such that playback of the currently-streaming stream appears uninterrupted, wherein the earliest key frame is determined to occur subsequent to a next key frame in the currently-streaming stream, the next key frame having not yet been transmitted to the client; and
streaming the new stream that replaced the currently-streaming stream, in accordance with the replacing;
wherein accessing client-side playback conditions comprises accessing client processing capability and one or more of the following: network bandwidth availability and user viewing statistics;
wherein the request includes at least one of a removal of a stream from the playlist and an insertion of another new stream into the playlist at a client specified insertion point in the playlist.

14. The method of claim 13, wherein the streams associated with the playlist include at least one of recorded or live: audio streams, video streams, mixed streams having audio and video, text-based data, still image data or user-defined data.

15. The method of claim 13, wherein the request includes at least one of (i) reordering the streams in the playlist; (ii) removing a stream from the playlist; or (iii) inserting another new stream into the playlist at a specified insertion point in the playlist.

16. The method of claim 13, wherein the new stream comprises a different version of the currently-streaming stream, the different version requiring different network and processing resources than the currently-streaming stream.

17. The method of claim 13, wherein the new stream comprises a different stream having different content than content of the currently-streaming stream.

18. A computer program product, encoded on a non-transitory computer-readable medium, operable to cause data processing apparatus to perform operations comprising:
streaming media streams associated with a playlist to a client, the playlist including an ordering of streams that are queued for transmission to the client for client-side playback at a client-side application according to the ordering;
receiving, from the client-side application, a request for a replacement on the playlist of a currently-streaming stream with a new stream responsive to detected client-side conditions, the request identifying the currently-streaming stream and the new stream;
replacing on the playlist the currently-streaming stream with the new stream based on the received request, the currently-streaming stream being replaced at an earliest key frame in the new stream such that playback of the currently-streaming stream appears uninterrupted, wherein the earliest key frame is determined to occur subsequent to a next key frame in the currently-streaming stream, the next key frame having not yet been transmitted to the client; and
streaming the new stream that replaced the currently-streaming stream, in accordance with the replacing;
wherein accessing client-side playback conditions comprises accessing client processing capability and one or more of the following: network bandwidth availability and user viewing statistics;
wherein the request includes at least one of a removal of a stream from the playlist and an insertion of another new stream into the playlist at a client specified insertion point in the playlist.

19. The computer program product of claim 18, wherein the streams associated with the playlist include at least one of recorded or live: audio streams, video streams, mixed streams having audio and video, text-based data, still image data or user-defined data.

20. The computer program product of claim 18, wherein the request includes at least one of (i) reordering the streams in the playlist; (ii) removing a stream from the playlist; or (iii) inserting another new stream into the playlist at a specified insertion point in the playlist.

21. The computer program product of claim 18, wherein the new stream comprises a different version of the currently-streaming stream, the different version requiring different network and processing resources than the currently-streaming stream.

22. The computer program product of claim 18, wherein the new stream comprises a different stream having different content than content of the currently-streaming stream.

23. A system, comprising:
a memory;
one or more processors to perform operations comprising:
streaming media streams associated with a playlist to a client, the playlist including an ordering of streams that are queued for transmission to the client for client-side playback at a client-side application according to the ordering;
receiving, from the client-side application, a request for a replacement on the playlist of a currently-streaming stream with a new stream responsive to detected client-side conditions, the request identifying the currently-streaming stream and the new stream;
replacing on the playlist the currently-streaming stream with the new stream based on the received request, the currently-streaming stream being replaced at an earliest key frame in the new stream such that playback of the currently-streaming stream appears uninterrupted, wherein the earliest key frame is determined to occur subsequent to a next key frame in the currently-streaming stream, the next key frame having not yet been transmitted to the client; and
streaming the new stream that replaced the currently-streaming stream, in accordance with the replacing;
wherein accessing client-side playback conditions comprises accessing client processing capability and one or more of the following: network bandwidth availability and user viewing statistics;
wherein the request includes at least one of a removal of a stream from the playlist and an insertion of another new stream into the playlist at a client specified insertion point in the playlist.

24. The system of claim 23, wherein the streams associated with the playlist include at least one of recorded or live: audio streams, video streams, mixed streams having audio and video, text-based data, still image data or user-defined data.

25. The system of claim 23, wherein the request includes at least one of (i) reordering the streams in the playlist; (ii) removing a stream from the playlist; or (iii) inserting another new stream into the playlist at a specified insertion point in the playlist.

26. The system of claim 23, wherein the new stream comprises a different version of the currently-streaming stream, the different version requiring different network and processing resources than the currently-streaming stream.

27. The system of claim 23, wherein the new stream comprises a different stream having different content than content of the currently-streaming stream.

28. The system of claim 23, further comprising one or more processors to perform operations comprising:
- receiving the streamed media streams associated with the playlist;
- detecting client-side playback conditions associated with the receipt and playback of at least one of the received streams;
- sending the request for the replacement on the playlist of the currently-streaming stream with the new stream responsive to detected client-side conditions; and
- displaying the new stream of the playlist that replaced the currently-streaming stream.

* * * * *